CONTROL SYSTEM FOR SIGNAL SEEKING TUNER

Filed Nov. 13, 1953

INVENTOR
Clarence J. Votava
BY R. E. Fowler
ATTORNEY

United States Patent Office 2,851,605

Patented Sept. 9, 1958

2,851,605

CONTROL SYSTEM FOR SIGNAL SEEKING TUNER

Clarence J. Votava, Kokomo, Ind., assignor to General Motors Corporation, Detroit, Mich., a corporation of Delaware Application November 13, 1953, Serial No. 391,841

7 Claims. (Cl. 250—40)

This invention relates to automatically tuned radio receiving apparatus and more particularly to that type of tuning means which is actuated by the arrival of an incoming signal at the receiver. This type of tuning has been called "signal seeking" or "stop-on-signal" tuning. There has recently been placed upon the market a combination of signal seeking and favorite station radio tuner. Such a control system is shown and described in copending application Serial No. 268,859, filed January 29, 1952, now Patent No. 2,744,193, granted May 1, 1956, in the name of Bertram A. Schwarz. In this type of tuner a switch is closed momentarily which energizes a relay to unlock the powered tuning means and permit it to proceed across the band. Upon the arrival of the tuning means at the next successive transmitted signal, said relay is deenergized to immediately lock the tuner at that point. Stored power is utilized to cause the tuning means to sweep or scan the band in one direction, which is recharged in a much shorter time upon the arrival of the tuner at one extremity of its travel, and quickly moves it to the opposite extreme. In the operation of the signal seeking tuner so far described there are occasionally received voltage pulses on the quick backstroke, which deenergize the control means. When the tuner, therefore, arrives at its recharged limit position, it stops on this spurious signal rather than proceeding on to the next station. It is, therefore, necessary to again actuate the control switch momentarily to cause the set to proceed to the next transmitting station.

In the favorite station signal seeking type there are, in addition to the normal momentarily closed switch, a plurality of spring biased locked-in switches which can be set to cause the tuner to stop on only one desired station during its scanning action. When one of these switches is pushed in, it locks in. If, therefore, a spurious signal causes stoppage on the backstroke or cocking stroke, it is not only necessary to again close the main signal seeking switch momentarily, but thereafter also again push in the desired station switch, as that has been released by forcing in the signal seeking switch. The problem, therefore, of causing spurious stoppage at the recharging end of travel is more serious with the favorite station signal seeking tuner than it is with the conventional signal seeking tuner.

It is therefore an object in making this invention to provide means in a signal seeking tuner to insure continued operation of the tuning means until a station is received.

It is a further object in making this invention to provide means in a signal seeking tuner for completing a shunt energizing circuit for the control means at the end of the cocking stroke so that the tuner will continue its movement.

It is a still further object in making this invention to provide in a signal seeking tuner an auxiliary grounding circuit at the end of the cocking stroke to maintain the control relay energized.

With these and other objects in view which will become apparent as the specification proceeds, my invention will be best understood by reference to the following specification and claims and the illustrations in the accompanying drawings, in which:

Figure 1:
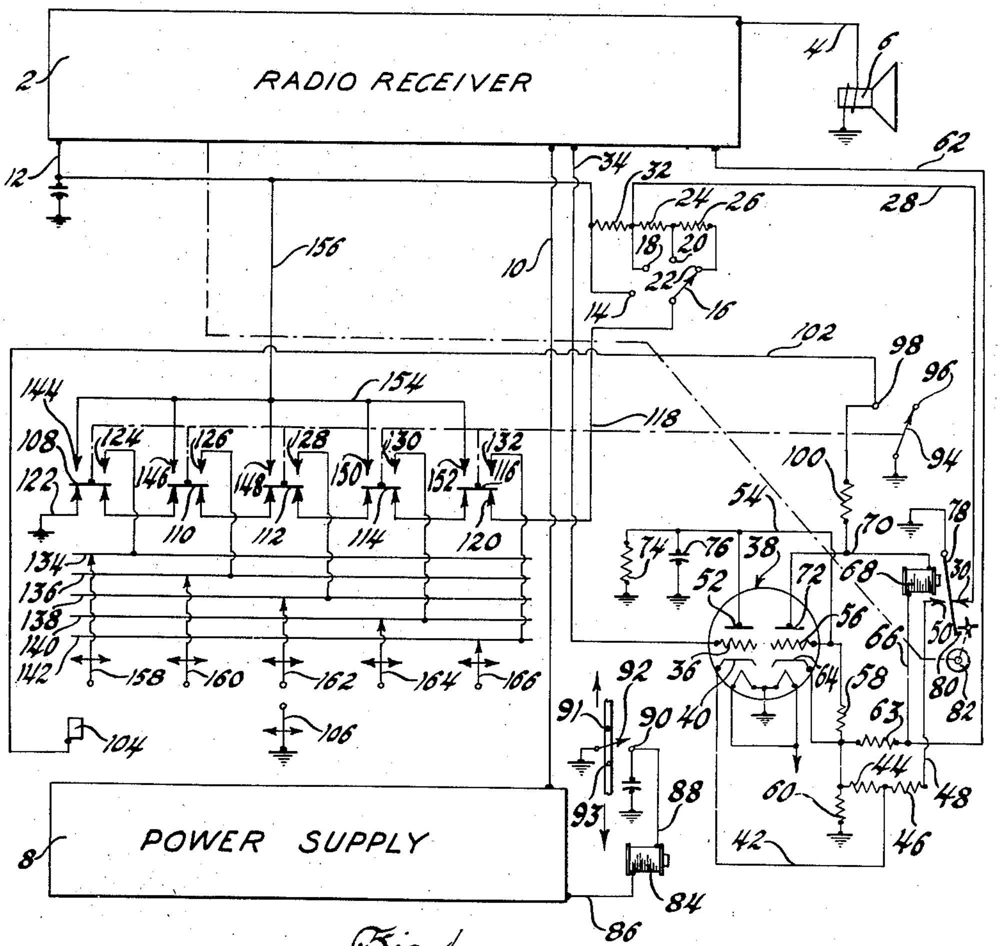
Figure 1 is a combination block and circuit diagram of a portion of a favorite station signal seeking tuner system incorporating my invention.

Referring now more particularly to Figure 1, there is shown therein a conventional radio receiver 2 including radio frequency and intermediate frequency amplifiers, detector and audio frequency amplifiers, the output of which is fed through line 4 to a loud speaker 6. The radio receiver is supplied with power from a power supply 8 through line 10. The cathodes of the amplifier tubes are connected to line 12, which extends to a stationary contact 14 engageable by a rotating switch arm 16. Stationary contacts 18, 20 and 22 are also engageable by rotating arm 16 and are directly connected to resistors 24 and 26, permitting varying amounts of resistance to be incorporated in the circuit. Contact 18 is connected through line 28 to stationary contact 30 of the control relay. A resistor 32 interconnects lines 12 and 28.

Upon receipt of a transmitted signal in the receiver, a voltage pulse is generated which is applied to control line 34 extending from the receiver 2 to the control grid 36 of the first triode section of a control tube 38. Cathode 40 is connected through line 42 to a midpoint between two resistors 44 and 46. The opposite terminal of resistance 46 is connected through line 48 with a stationary contact 50 of the control relay. Plate 52 of the first triode section of tube 38 is connected through line 54 to control grid 56 of the second triode section. Two resistances 58 and 60 are connected in series between grid 56 and ground, and one terminal of the resistance 44 is connected to a midpoint between these two resistances. Line 62 is directly connected to one terminal of resistor 63, which is connected to the cathode 64 of the second triode section of the tube 38 and extends back to the radio receiver 2 and is a source of power therefrom.

Line 66 is interconnected between line 62 and one terminal of the solenoid 68 of the control relay. The opposite terminal of the solenoid 68 is connected through line 70 with the plate 72 of the second triode section of the tube 38. Resistance 74 and capacitor 76 are connected in parallel between line 54 and ground. Relay armature 78 is directly connected to ground and oscillates between stationary contacts 30 and 50. It has an elongated extension and angled end 80 which is adapted to engage and lock the tuning drive means 82 when in the position shown, but to move away from engagement therewith when the coil 68 is energized.

In devices of this general order the tuning motor, indicated diagrammatically as 82, is powered by a storage spring which causes the tuning means in the receiver to traverse the band in one direction. Upon reaching one end, however, means must be provided to recharge the storage spring and this is provided by a charging solenoid 84 which, when it attracts its armature, moves the tuning means quickly back to its other extreme position. This solenoid 84 is connected to the power supply through line 86 and through line 88 to a stationary contact 90. Movable switch arm 92 is adapted to engage stationary contact 90 and is grounded. Movable arm 92 is physically moved by means projecting from the tuner so that this switch is closed when the tuner reaches one end of its travel, and is opened upon the tuner reaching the opposite end of travel.

A manual switch arm 94 which is grounded is adapted to engage two stationary contacts 96 and 98. Contact 96 is unconnected. Contact 98 is connected through resistor 100 to line 70 and through line 102 to a flat conductive plate 104 adjacent the end of travel of the indicating needle so that the needle will engage the plate and complete an electrical circuit at this point. The indicating needle is shown diagrammatically at 106, the double arrow indicating movement over the band.

The favorite station buttons are shown at the left central portion of Figure 1 and are in this instance five in number. These are indicated at 108, 110, 112, 114 and 116. They are shown in non-actuating position. Rotary arm 16 is connected through line 118 to stationary contact 120 of the selective switch 116. Without indicating each of the contacts, it will be obvious that each switch armaure completes a series circuit between line 118 and ground through line 122 as long as all of these are in their non-actuated position. Thus a grounding circuit for the sensitivity control 16 is provided through these five switches in series. If any one of the switches is actuated to bring in a single desired station, the grounding circuit for the sensitivity control is broken.

Each of these switches has a contact such as 124, 126, 128, 130 and 132, which is connected to one of the trolley wires 134, 136, 138, 140 and 142 respectively. Each switch also is provided with a contact such as 144, 146, 148, 150 and 152, which are commonly connected to line 154 and thence through tie line 156 with line 12 of the cathode string. Each of the trolley wires has an adjustable tab that is capable of sliding along its length and having electric contact therewith which extends to a point adjacent the path of the indicating needle 106 so that when in alignment with the latter, it engages the same to complete a circuit from the various trolley lines to the end of the indicating needle. These tabs are indicated at 158, 160, 162, 164 and 166, and can be positioned at various points along the length of the associated trolley wire in order to cause the stoppage of the tuner at certain desired stations.

Figure 2:
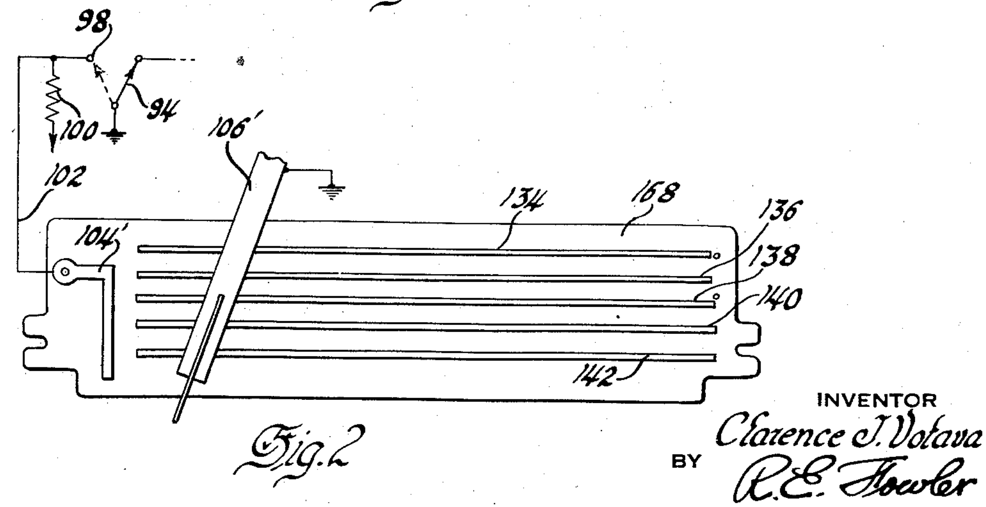
Figure 2 is a diagrammatic showing of the means incorporated in the set for carrying out my invention.

Figure 2 is a diagrammatic showing of the physical parts incorporated in my invention. In that case the indicating needle 106' is shown in part connected to ground and sweeping over the length of a contact board 168 on which the control wires 134, 136, 138, 140 and 142 are mounted. This board is of insulated material and is conventionally mounted in the front of the receiver below the path of the indicating means. On one end of the board there is mounted an L-shaped contact 104' which is connected through line 102 with stationary contact 98 of the signal seeking switch 94.

In the operation of the tuner it is assumed that the receiver is tuned to a particular station and the operator desires to move to another by the ordinary signal seeking feature. He therefore moves switch arm 94 to close contact with stationary contact 98. This completes an energizing circuit for the coil 68 as follows: power line 62, line 66, coil 68, line 70, resistance 100, contact 98, arm 94 to ground. As soon as the tuner has moved even a small amount, the signal received and amplified by the receiver from the transmitting station disappears and when it does so the grid 36 goes sufficiently negative to cut off conduction through the first triode section of the tube. This increases the potential on the grid 56 of the second section of the tube and that portion becomes conductive. Thus the operator may now release arm 94, but an energizing circuit is completed through the second triode section of the tube to ground and coil 68 remains energized, holding armature 78 in the left-hand position and permitting the tuner to move. Upon the tuning-in of another transmitted signal, the grid 36 receives a positive pulse, and the first triode section conducts, reducing the voltage on the second grid 56 to cut off that portion of the tube and deenergize coil 68. Armature 78 then moves to the right-hand position, stopping tuning means 82 on station. The sensitivity of the receiver during tuning is controlled by the position of the rotatable arm 16 with its associated resistors 32, 24 and 26.

If the operator desires a particular station such as set up on any one of the switches 108, 110, 112, 114 and 116, he depresses such switch, for example switch 112. By moving away from the lower contacts, this switch opens the grounding circuit for the sensitivity control 16, but at the same time completes a portion of the grounding circuit from the cathode string from line 12 through line 156, contact 148, switch arm 112, contact 128, trolley line 138 to adjustable tab 162. No grounding circuit for the receiver can be completed, therefore, to provide a sufficiently strong stopping pulse until pointer 106 aligns itself with tab 162. When this occurs, the receiver is again placed in condition to provide the necessary stopping pulse, and does so to stop the tuner on the desired station.

When the spring power means has reached one end of its travel, an abutment 91 on the tuner causes arm 92 to engage contact 90, completing an obvious circuit to repowering relay 84, which pulls the tuner means back to the opposite extreme. Upon reaching that point, another spaced abutment 93 forces arm 92 away from contact 90 to deenergize the relay. In some instances upon this rapid backstroke an erroneous stopping pulse may be obtained to deenergize the relay coil 68, in which instance upon arriving at the recocked end of travel the tuner merely stops. If one of the favorite station buttons has been depressed, the operator must first close switch 94 to reenergize relay 68. However, when this occurs through mechanical interlocks, the formerly depressed favorite station button pops out and it must therefore again be depressed to obtain this station, making both switch operations necessary upon receipt of an erroneous signal.

In order to avoid this, I have provided a separate energizing circuit for the coil 68 which is completed each time the tuning means is moved to the extreme recocked position. When, therefore, the indicating means 106 is moved to the extreme left, as shown in the figures, it engages contact 104 to complete a separate grounding circuit for the relay coil 68. This circuit may be traced as follows: power line 62, line 66, coil 68, line 70, resistance 100, contact 98, line 102, contactor 104, indicator 106 to ground. This has exactly the same effect as closing the switch 94, but does not have the disadvantage of mechanical actuation, which would cause any actuated favorite station switch to move outwardly to its nonenergized position, and therefore insures that each time the tuner is moved to its charged extreme, the relay coil 68 will be energized under any circumstances, and the tuner will proceed to the next transmitting station, either favorite station selection or ordinary signal seeking selection.

I claim:

1. In radio receiving apparatus having tuning means, driving means for the tuning means to cause the tuning means to repetitively scan a predetermined band of frequencies, indexing means to control the driving means and stop the same upon receipt of an incoming signal, manually operable switching means connected in circuit with the indexing means to complete an energizing circuit to the indexing means to initiate movement of the tuning means to a new location when said manually operable switching means is actuated, and an independent energizing circuit for the indexing means at one end of the band to maintain the driving means in operation.

2. In a radio receiver having variable tuning means that is driven repetitively in alternate directions across a predetermined portion of the frequency spectrum, indexing and control means connected to the driven tuning means and to the receiver to stop or index the same upon receipt of an incoming signal in the receiver, manually operable switching means connected in circuit with the indexing and control means to complete an energizing circuit to the indexing and control means to initiate movement of the tuning means to a new location when said manually operable switching means is actuated and an independent control circuit for the indexing means completed only at one extremity of travel of the tuning means to maintain operation of the driving means regardless of all other factors at that point.

3. In radio receiving means having variable tuning means, driving means for moving the tuning means in one direction, reloading means for the driving means to move the tuning means in the opposite direction, solenoid means controlling the driving means, control means for the solenoid means connected to the receiver and deenergizing said solenoid means upon receipt of an incoming signal in the receiver and energizing the same for tuning to a new location and an independent control circuit for the solenoid means to energize the same at one end of the tuner travel regardless of all other factors.

4. In radio receiving apparatus having tuning means and means to repetitively drive said tuning means in opposite directions across a predetermined band of frequencies, control means for the driving means connected to said receiving apparatus to stop the driving means upon receipt of an incoming signal in the receiving apparatus, manually operable switching means connected in circuit with the control means to complete an energizing circuit to the control means to initiate movement of the tuning means to a new location when said manually operable switching means is actuated and an independent control circuit to maintain said driving means in operation only at one extremity of travel irrespective of all other factors.

5. In radio receiving apparatus having variable tuning means, means for driving said tuning means in one direction, means for repowering said driving means and moving the tuning means in the opposite direction, electronic control means connected to the receiving apparatus to control the driving means and index the tuning means upon the receipt of an incoming signal in the apparatus, manually operable switching means connected in circuit with the electronic control means to complete an energizing circuit to the electronic control means to initiate movement of the tuning means to a new location when said manually operable switching means is actuated, an independent control circuit connected to the first-named control means including a contact at one extremity of movement of the tuning means and means movable with the tuning means engageable with the contact and completing an energizing circuit to maintain the driving means in operation at said extremity of movement regardless of any other factors.

6. In a radio receiver having variable tuning means, power storage means connected to said tuning means to drive it in one direction over a prescribed band, indexing stopping means engageable with the tuning means when deenergized to stop the tuning means as it is driven by the power storage means, a plurality of manually operable switching means connected in circuit with the indexing stopping means to energize the same and initiate movement of the tuning means to a new location means for charging said power storage means and moving said tuning means in the opposite direction to a limit, and an independent energizing circuit to provide a separate energizing pulse for the indexing stopping means connected to the indexing stopping means and completed at the extremity of tuner travel to assure energization of the indexing stopping means when the power storage means is recharged.

7. In a radio receiver having variable tuning means, power storage means connected to said tuning means to drive it in one direction over a prescribed band, indexing stopping means engageable with the tuning means when deenergized to stop the tuning means as it is driven by the power storage means, a plurality of manually operable switching means connected in circuit with the indexing stopping means to energize the same and initiate movement to a new location means for charging said power storage means and moving said tuning means in the opposite direction to a limit, indicating means connected to said tuner and movable therewith, conductive means mounted adjacent one end of the indicator travel, said indicator and said conductive means forming switching means, and an independent energizing circuit including said last-named switching means connected to said indexing stopping means to energize the same at the charging limit of tuner movement.

References Cited in the file of this patent

UNITED STATES PATENTS

| | | |
|---|---|---|
| 2,304,871 | Andrews | Dec. 15, 1942 |
| 2,499,573 | Dunn | Mar. 7, 1950 |
| 2,614,213 | Tynan | Oct. 14, 1952 |
| 2,744,193 | Schwarz | May 1, 1956 |
| 2,745,015 | Stillman | May 8, 1956 |